UNITED STATES PATENT OFFICE.

CHARLES F. WASHBURN, OF SAN FRANCISCO, CALIFORNIA.

IMPROVEMENT IN MEDICAL COMPOUNDS FOR THE CURE OF RHEUMATISM.

Specification forming part of Letters Patent No. 120,802, dated November 7, 1871.

*To all whom it may concern:*

Be it known that I, CHARLES F. WASHBURN, of the city and county of San Francisco, State of California, have invented an Improved Medical Compound for Rheumatism and Neuralgia; and I do hereby declare that the following is a full and exact description of the same.

The object of my invention is to provide an improved medicinal compound which is chiefly beneficial in cases of rheumatic and neuralgic attacks and others of a like nature; and it consists of a solution or tincture of certain herbs, hereinafter specified, which, after proper preparation, are to be taken internally in suitable doses.

In order to prepare this compound I take one ounce of Virginia snake-root, ground fine; one ounce of blood-root, ground fine or pulverized; and one ounce of grated horse-radish. The horse-radish should preferably be in a dry state, but if not convenient it may be used in a green state. These component parts are thoroughly mixed, and one pint of pure brandy added. Let it stand and macerate forty-eight hours or more, after which the liquor may be strained off for use. It will, however, be found preferable to allow the mixture to remain together, and the whole to be thoroughly shaken before using.

The dose should be one teaspoonful three times per diem—morning, noon, and night. The effect in most cases will be to relieve the pain in twenty-four hours, and if only ordinary cases the cure will be radical. In severe cases a longer time will be required to effect a cure.

Having thus described my invention, what I claim, and desire to secure by Letters Patent, is—

A mixture composed of the above-named ingredients compounded in about the proportions above described.

In witness whereof I have hereunto set my hand and seal.

CHARLES F. WASHBURN. [L. S.]

Witnesses:
    ED. M. PATTEN, Jr.,
    C. W. M. SMITH.

(98)